United States Patent
Zhao

(10) Patent No.: US 12,411,791 B2
(45) Date of Patent: Sep. 9, 2025

(54) SYSTEMS, DEVICES AND METHODS RELATED TO WIRELESS NETWORK HAVING LOW LATENCY

(71) Applicant: SKYWORKS SOLUTIONS, INC., Irvine, CA (US)

(72) Inventor: Xudong Zhao, Portland, OR (US)

(73) Assignee: Skyworks Solutions, Inc., Irvine, CA (US)

( * ) Notice: Subject to any disclaimer, the term of this patent is extended or adjusted under 35 U.S.C. 154(b) by 131 days.

(21) Appl. No.: 18/128,164

(22) Filed: Mar. 29, 2023

(65) Prior Publication Data

US 2023/0315671 A1  Oct. 5, 2023

Related U.S. Application Data

(60) Provisional application No. 63/325,141, filed on Mar. 29, 2022.

(51) Int. Cl.
*G06F 13/42* (2006.01)
*G06F 3/16* (2006.01)

(52) U.S. Cl.
CPC .............. *G06F 13/42* (2013.01); *G06F 3/162* (2013.01)

(58) Field of Classification Search
None
See application file for complete search history.

(56) References Cited

U.S. PATENT DOCUMENTS

| | | | |
|---|---|---|---|
| 10,700,765 B1* | 6/2020 | Syed | G06F 21/83 |
| 2020/0137470 A1* | 4/2020 | Chazot | H04L 1/0072 |
| 2021/0351833 A1* | 11/2021 | Sakhnini | H04B 7/0641 |
| 2021/0409522 A1* | 12/2021 | Ferrari | H04R 25/554 |

* cited by examiner

*Primary Examiner* — Henry Tsai
*Assistant Examiner* — Dean Phan
(74) *Attorney, Agent, or Firm* — Chang & Hale LLP

(57) ABSTRACT

In some embodiments, a wireless network architecture can include a network protocol configured to allow communication between a host device and each of an audio device and a human interface device. The network protocol can include a transaction having a time duration, with the transaction including a plurality of sub-transactions arranged in sequence. Each sub-transaction can have a time duration and a frame for the human interface device such that a latency period associated with the human interface device is greater than or equal to the time duration of the sub-transaction but less than the time duration of the transaction.

18 Claims, 6 Drawing Sheets

| packet id | description | packet sender | arb packet descriptor | cli packet descriptor | OTA_BLOCKS | ACK_PREVIOUS_TR |
|---|---|---|---|---|---|---|
| 0 | mouse | mouse | `01901828 | `01905810 | 0 | |
| 1 | keyboard | keyboard | `06401848 | `06405810 | 0 | |
| 2 | arb | arb | `0AF05804 | `0AF0180c | 10 | 1 |
| 3 | mouse | mouse | `30701828 | `30705810 | 0 | |
| 4 | keyboard | keyboard | `35201848 | `35205810 | 0 | |
| 5 | arb | arb | `39d05804 | `39d0180c | `8/10 | 1 |
| 6 | | | | | | |
| 7 | | | | | | |
| 8 | | | | | | |
| 9 | arb sync | arb | `55F04200/55F04400 | `00000210/55F00410 | 0 | |
| 10 | cli sync | cli | `5AA00210/5AA00410 | `04B04210/5AA04410 | 0 | |
| 11 | | | | | | |
| 12 | mouse | mouse | `5F501828 | `5F505810 | 0 | |
| 13 | keyboard | keyboard | `64001848 | `64005810 | 0 | |
| 14 | headset | headset | `68B01808 | `68B95810 | 5 | 0 |
| 15 | arb sniff | | `7d640140 | | | |

FIG.4

SYSTEMS, DEVICES AND METHODS RELATED TO WIRELESS NETWORK HAVING LOW LATENCY

CROSS-REFERENCE TO RELATED APPLICATION(S)

This application claims priority to U.S. Provisional Application No. 63/325,141 filed Mar. 29, 2022, entitled WIRELESS NETWORK HAVING LOW LATENCY, the disclosure of which is hereby expressly incorporated by reference herein in its entirety.

BACKGROUND

Field

The present disclosure relates to a wireless network having low latency.

Description of the Related Art

An electronic device such as a computer, tablet, smartphone, or the like can interface with a user through a number of interface devices. Such interfacing functionality can be controlled and/or supported by, for example, an arbiter attached to or part of the electronic device, so as to allow appropriate transfer of information between the electronic device and the interface devices.

SUMMARY

In accordance with a number of implementations, the present disclosure relates to a wireless network architecture having a network protocol configured to allow communication between a host device and each of an audio device and a human interface device. The network protocol includes a transaction having a time duration, and the transaction includes a plurality of sub-transactions arranged in sequence. Each sub-transaction has a time duration and a frame for the human interface device such that a latency period associated with the human interface device is greater than or equal to the time duration of the sub-transaction but less than the time duration of the transaction.

In some embodiments, the audio device can be a headset, and the plurality of sub-transactions can include a plurality of payloads to be delivered from the host device to the headset, and a payload to be delivered from the headset to the host device. The plurality of payloads can include an audio signal, such as a stereo audio signal, for the headset. The payload to be delivered from the headset to the host can include a voice signal such as a mono voice signal.

In some embodiments, the plurality of sub-transactions can include three sub-transactions, such that two of the three sub-transactions include the payloads for the headset and the third sub-transaction includes the payload from the headset.

In some embodiments, the human interface device can include a mouse or a keyboard. In some embodiments, the wireless network architecture can further include an additional human interface device, such that each sub-transaction further includes a frame for the additional human interface device. In some embodiments, the human interface device can include a mouse, and the additional human interface device can include a keyboard.

In some embodiments, the time durations of the sub-transactions are approximately the same. In some embodiments, the latency period associated with the human interface device can be less than or equal to 110% of the time duration of each sub-transaction. In some embodiments, the time duration of the transaction is at least 3 ms.

In some embodiments, the host device is a computing device. In some embodiments, the computing device can be a gaming device.

In some embodiments, a selected one of the sub-transactions can include overhead information needed for the completion of the transaction. In some embodiments, the overhead information can be included only in the selected sub-transaction and not in any other sub-transaction(s).

In some implementations, the present disclosure relates to a system that includes a host device, an audio device and a human interface device. The system further includes a network protocol configured to provide communication between the host device and each of the audio device and the human interface device. The network protocol includes a transaction having a time duration, with the transaction including a plurality of sub-transactions arranged in sequence. Each sub-transaction has a time duration and a frame for the human interface device such that a latency period associated with the human interface device is greater than or equal to the time length of the sub-transaction but less than the time length of the transaction.

According to some implementations, the present disclosure relates to a method for transferring wireless data. The method includes assembling information to be transferred in a transaction between a host device and a plurality of interface devices including a human interface device. The method further includes arranging the information into a plurality of sub-transactions such that a latency period associated with the human interface device is less than time duration of the transaction.

In some embodiments, the latency period associated with the human interface device can be greater than or equal to time duration of each sub-transaction.

In some embodiments, the plurality of interface devices can further include an additional human interface device and an audio device. In some embodiments, the plurality of sub-transactions can include three sub-transactions, such that each sub-transaction includes content for the human interface device and the additional human interface device. In some embodiments, the human interface device can include a mouse and the additional human interface device can include a keyboard.

In some embodiments, the arranging of the information into the three sub-transactions can include providing overhead information needed for the transaction into a selected sub-transaction. In some embodiments, the overhead information needed for the transaction can be only in the selected sub-transaction and not in any other sub-transaction. In some embodiments, the overhead information needed for the transaction can be provided in the last of the three sub-transactions.

In some embodiments, the arranging of the information into the three sub-transactions can include providing content associated with the audio device in one or more of the three sub-transactions. The content associated with the audio device can include a forward audio content for a speaker of the audio device in each of two of the sub-transactions, and a reverse audio content from a microphone of the audio device in the remaining sub-transaction. The two sub-transactions with the respective forward audio contents can be first and second of the three sub-transactions, and the remaining sub-transaction with the reverse audio content can be the last of the three sub-transactions.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 4 shows examples of packet descriptors that can be implemented for the network protocol of FIG. 3.

DETAILED DESCRIPTION OF SOME EMBODIMENTS

Figure 1:
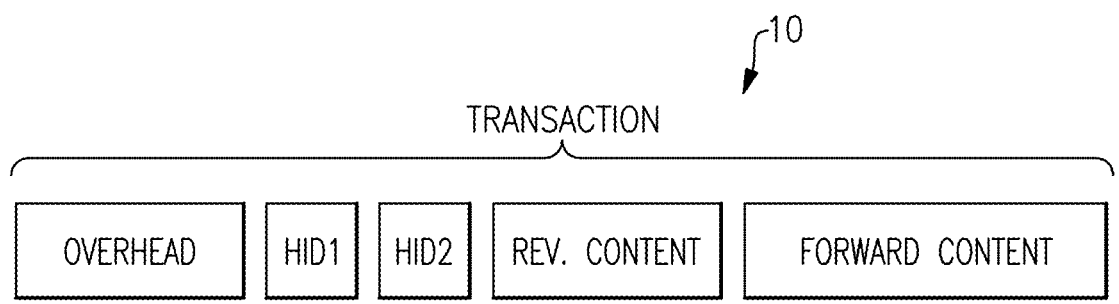
FIG. 1 depicts an example of a conventional network protocol that utilizes a transaction with allocated frames for overhead, a plurality of human interface devices (HIDs), reverse content and forward content.

The headings provided herein, if any, are for convenience only and do not necessarily affect the scope or meaning of the claimed invention.

In many applications, an electronic device such as a computer, tablet, smartphone, gaming device or the like can interface with a user through a number of interface devices. Such interfacing functionality can be controlled and/or be supported by, for example, an arbiter attached to or part of the electronic device, so as to allow appropriate transfer of information between the electronic device and the interface devices. In some embodiments, such interfacing between the electronic device and the interface devices can be achieved with a wireless network.

In some embodiments, a wireless network can be configured to support interfacing between an electronic device and a number of interface devices being utilized by a user. For example, an arbiter dongle (e.g., USB dongle) can be plugged into the electronic device and be configured to support sending of stereo audio signal to a headset through the wireless network. The headset can then process the stereo audio signal and provide stereo sound to the user. The headset can also include a microphone that allows voice signal (e.g., mono voice signal having 96 dB SNR and 6.5 KHz bandwidth) to be sent from the head set to the electronic device through the arbiter dongle.

In addition to the headphone, one or more other interface devices may be in communication with the electronic device to provided more efficient interfacing between the user and the electronic device. For example, a wireless mouse can be part of the wireless network as a client, and be configured to send control data to the electronic device in response to one or more actions of the user provided to the mouse. In another example, a wireless keyboard can be part of the wireless network as a client, and be configured to send control data to the electronic device in response to one or more actions of the user to the keyboard.

In the foregoing example wireless network, some performance levels may be required or desirable. For example, stereo audio can be provided to have at least 20 KHz audio bandwidth and 96 dB SNR; mono voice can be provided to have at least 6.5 KHz bandwidth and 96 dB SNR; latency for both stereo audio and mono voice can be specified to be less than 20 ms; latency for mouse and keyboard can be specified to be less than 1 ms (e.g., with the latency being a time interval between when firmware writes data into register on device side, and when the data is read by firmware on dongle side); and both keyboard and mouse data can be up to 24 bytes in length.

It is noted that a wireless network typically utilizes a stream of transactions. In such a stream of transactions, a given transaction is typically considered to all information required for a completed communication between a sender and a receiver. Such information typically includes data to be exchanged, as well as overhead information to support the exchange.

For example, a virtual machine interface (VMI)/virtual machine extension (VMX) protocol divides time into transactions, and the length of transaction can be programmable. In such a protocol, however, in each transaction, each active device in the network may send one frame. Therefore, protocol latency for an HID (human interface device) such as a mouse includes the transaction length plus frame length. Accordingly, to meet the foregoing example latency requirement of 1 ms for the mouse and keyboard devices, the transaction length needs to be less than 1 ms.

However, suppose that an overhead for each transaction is about 280 μs, to support channel sniffing and channel hopping. Additionally, suppose that preamble and header plus frame gap for each frame is about 85~90 μs, and each of five audio blocks requires about 77 μs. Accordingly, allocated time for the five example audio blocks in each transaction is about 385 μs. Thus, a transaction having a duration less than 1 ms does not leave sufficient room for audio and voice payloads.

FIG. 1 depicts an example of a conventional network protocol 10 that utilizes a transaction with allocated frames for overhead, first human interface device HID1 (e.g. mouse), second human interface device HID2 (e.g., keyboard), reverse content (e.g., mono voice) and forward content (e.g., stereo audio). It is noted that the order of the frames in the example of FIG. 1 may be different in some protocols. It is also noted that while the frame sizes may or may not be to scale, it is evident that payloads such as voice and audio contents need to share a transaction length with other frames.

As described above, the length of the transaction of FIG. 1 can be programmable. Thus, the length of a transaction can be increased to sufficiently accommodate the payloads. However, and as also described above, latency of HIDs will also increase to at least the increased transaction length if the transaction is configured as in FIG. 1.

Figure 2:
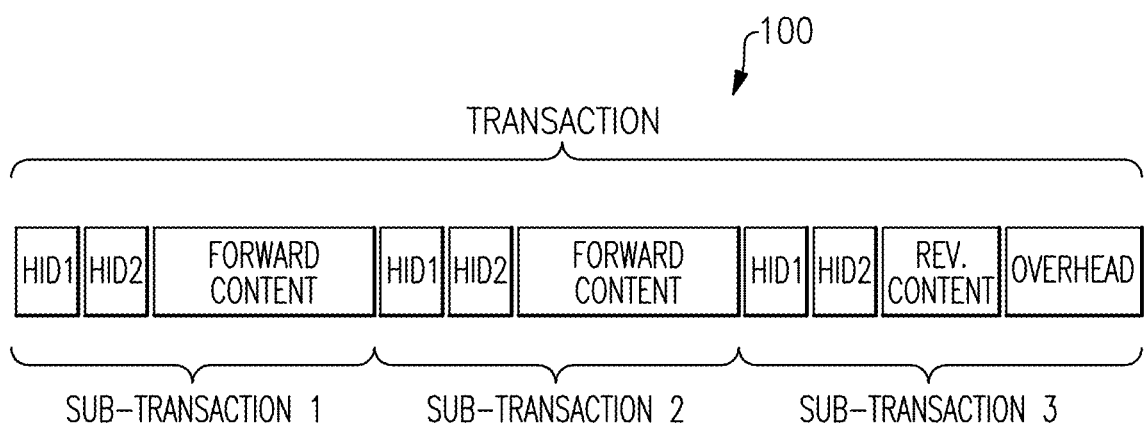
FIG. 2 shows that in some embodiments, a transaction of a network protocol can include a plurality of sub-transactions.

FIG. 2 shows that in some embodiments, a transaction of a network protocol 100 can include a plurality of sub-transactions. In the example of FIG. 2, three sub-transactions are included in a transaction; however, it will be understood that other numbers of sub-transactions can be utilized for a transaction.

In some embodiments, the transaction and its sub-transactions of FIG. 2 can be configured so that latency of an HID depends on a sub-transaction length and not on transaction length (as in FIG. 1). In some embodiments, such HID latency depending on sub-transaction length can be achieved by including HID frame(s) in each of the sub-transactions of the transaction.

For example, and referring to FIG. 2, each of the three example sub-transactions is shown to include HID1 (e.g. mouse) and HID2 (e.g., keyboard) frames. The first sub-transaction includes a forward content (e.g., stereo audio) frame. Similarly, the second sub-transaction includes a forward content (e.g., stereo audio) frame. The third sub-transaction is shown to include a reverse content (e.g., mono voice) frame and an overhead frame. Thus, by distributing the payload and overhead frames among the sub-transactions, sufficient lengths of such frames can be provided, while allowing HID latency to be relatively small due to HID frames in each sub-transaction.

In the context of the example HID latency requirement of 1 ms or less, a relatively long transaction can be divided into a plurality of sub-transactions, with each sub-transaction having a length that is less than 1 ms. If HID frames are included in each sub-transaction, the foregoing example HID latency can be met.

Figure 3:
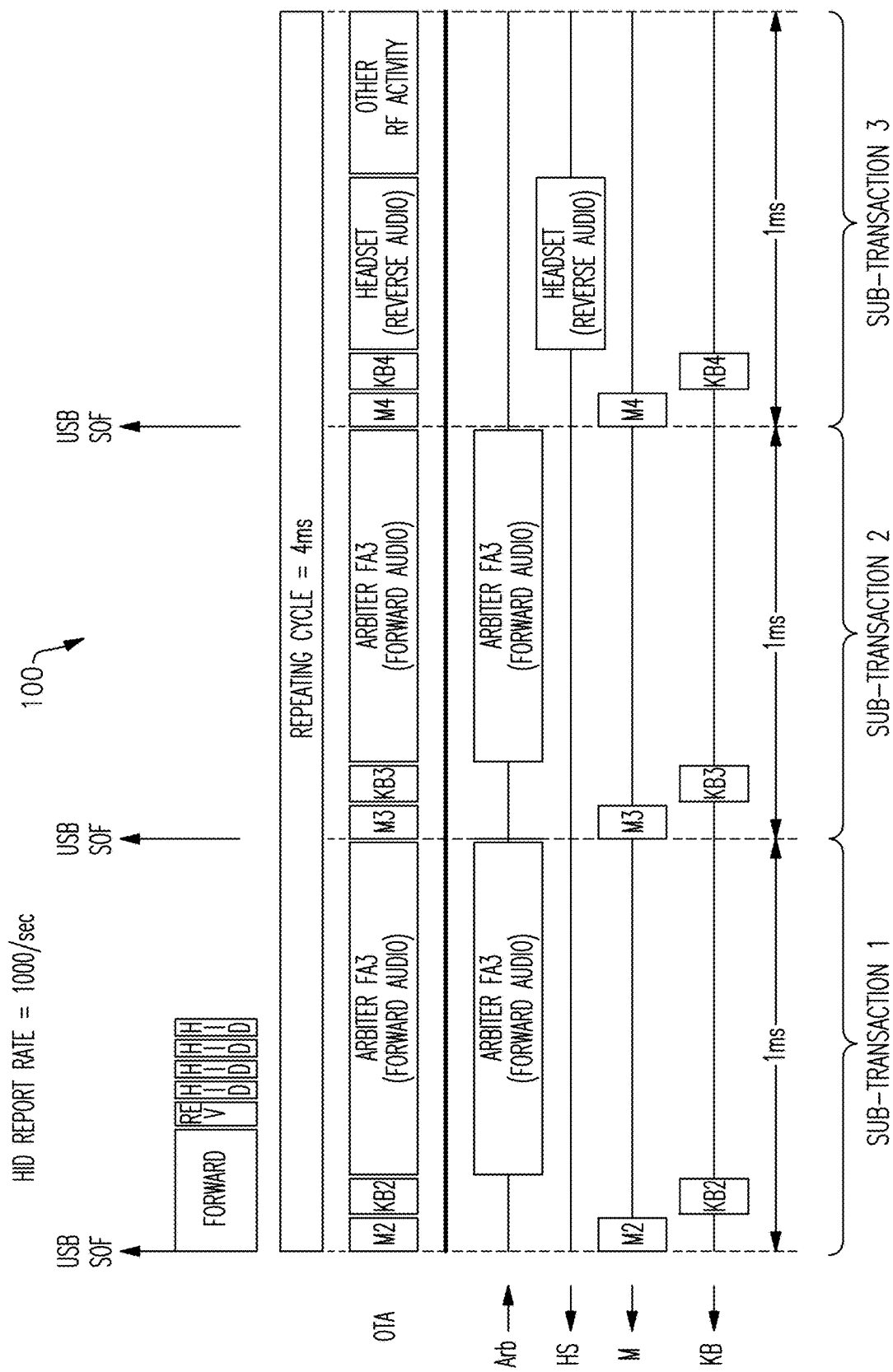
FIG. 3 shows an example of a transaction of a network protocol that can be a more specific example of the network protocol of FIG. 2.

FIG. 3 shows an example of a transaction of a network protocol 100 that can be a more specific example of the network protocol 100 of FIG. 2. In the example of FIG. 3, 3 ms transactions can be provided. Each transaction is divided into three sub-transactions each having a duration of about 1 ms. In the first two sub-transactions, each includes a mouse frame (M2 in the first sub-transaction, M3 in the second sub-transaction), a keyboard frame (KB2 in the first sub-transaction, KB3 in the second sub-transaction) and an arbiter frame (Forward audio). The third sub-transaction is shown to include a mouse frame (M4), a keyboard frame (KB4), a headset frame (Reverse audio) and transaction overhead indicated as Other RF Activity.

In the example of FIG. 3, latency for each HID frame would be the sub-transaction duration (1 ms) plus the HID frame duration (e.g., about 100 µs), for a total duration of about 1.1 ms. To further reduce the overall latency from an HID device issuing a command to host receiving the command from a dongle, one can have the dongle to be a master and synchronize the dongle frame timing with sub-transaction timing so that the data in HID frames can be transferred in dongle frame at earliest possible time.

As described above, each HID frame in each sub-transaction can have a duration of about 100 µs. It is noted that each of the arbiter frames (Forward audio) of the first and second sub-transactions can include preamble and header having a combined duration of about 100 µs. Thus, if each sub-transaction has a duration of 1 ms, each of the first and second sub-transactions can provide about 700 µs for audio content. Thus, for an audio block size of 77 µs, nine audio blocks can be included in each of the first and second sub-transactions, for a total audio payload per transaction of 18 blocks.

In the example of FIG. 3, one can utilize 128 sample per transaction mode for stereo audio. Such a configuration can provide a sample rate of 42.7 KHz (128 samples per 3 ms). It is noted that one can obtain a 20 KHz passband out of such a sample rate.

In the example of FIG. 3, each audio block having 77 µs size can contain 384 information bits. If one utilizes 18 bit audio samples, 108 dB signal-to-noise (SNR) can be achieved.

It is noted that six blocks can be utilized per channel. With 18 blocks allowed in the example of FIG. 3, one can provide 50% redundancy for possible retransmission, which is sufficient for a robust audio link.

Referring to the example of FIG. 3, for the last sub-transaction, the time allocated for voice (Reverse audio) can be about 1000 µs-300 µs-280 µs=420 µs, with the 1000 µs being the sub-transaction duration, the 300 µs being a sum of the HID frames (M4 and KB4, 100 µs each) and a combined duration of about 100 µs for preamble and header for the Reverse audio frame, and the 280 µs for the transaction overhead (Other RF Activity). Such an allocation of 420 µs can fit five 77 µs audio blocks.

If one utilizes 48 sample per transaction for voice, a sample rate of 16 KHz (48 samples per 3 ms) and a passband of 7 KHz can be achieved.

One can utilize 16 bit audio samples, which provides an SNR of 96 dB.

It is noted that two audio blocks can be utilized per channel. Based on the foregoing examples with respect to the last sub-transaction, one can see that an ample bandwidth can be provided for a robust voice link.

In some embodiments, some or all of the following can be implemented to support the example protocol of FIG. 3. For example, one can provide a maximal frame header length of 96 bits.

In another example, to support the protocol of FIG. 3, a plurality of sub-transactions can be supported. More particularly, an ability to handle multiple frames from the same sender in a transaction can be supported. To enable such a functionality, one can provide a firmware defined parameter for each active over-the-air (OTA) frame (e.g., up to 15). In some embodiments, the last packet can be reserved for sniff functionality.

In yet another example, protocol parameters can include header length, maximal number of blocks in a frame, sender, and/or audio acknowledgement for current transaction or for previous transaction.

In yet another example, register-transfer level (RTL) changes can include and/or be supported by a packet transfer mode (PTM) to provide packet id, audio_mem to compute the number of blocks for each frame from the total block number in a transaction (e.g., provided in a header of first frame), a maximal number of block for each frame from the sender, and/or audio_mem to change the way of acknowledgement handling to enable multi frame in the same transaction.

In yet another example, one can provide a capability of handling multiple frame headers from the same sender. In some embodiments, one can assume that there are maximal four sub-transactions. For such a configuration, there can be four possible transmitted frame headers per transaction. There can be maximal sixteen packet descriptors in a transaction. Thus, there can be maximal sixteen frame headers received for each transaction.

In yet another example, an RTL change to support multiple frame headers can include a 4-element first-in-first-out (FIFO) for transmit (Tx) headers. Firmware can write the next Tx frame header with a write to set flag. Hardware can store the new header in the FIFO and clear the flag so that firmware can keep writing new Tx headers into it. In some embodiments, hardware will try to send the headers in order in the earliest available frames. Thus, firmware can write data in a timely manner. In some embodiments, such a feature only makes a difference when a HID command is larger than media access control (MAC) header and is divided into multiple frames. Otherwise, MAC can write the data as soon as possible to ensure low latency.

In some embodiments, a receive (Rx) header register can increase, for example, from 8 to 16. Instead of identifying the headers by the sender, they can be identified by packet id. Firmware can find the sender from the corresponding packet descriptor information. There can be a 16 bit write to clear register, with each bit corresponding to a packet. Hardware can set the bit if the corresponding packet contains a valid received frame header. Firmware can clear it when the frame header is processed.

In some embodiments, firmware for HID devices can include some or all of the following features. For example, on the Tx side, when a HID command is received, firmware can write it to a Tx header register and set a corresponding flag. Also, the firmware can set the next available HID packet active. Hardware can then send the header in the next active Tx packet.

In another example, on the Rx side, PTM can issue an interrupt at the end of a frame header. Upon such an interrupt, firmware can look at the 16 bit frame header available register. Then the firmware can process the frame header and send the included HID command in the next available dongle frame.

In some embodiments, some or all of the following example firmware registers can be implemented for the protocol of FIG. 3. For example, AUDIO_MEM_USE_PACKET_ID field in AUDIO_CONFIG register can be set.

In another example, a transaction length can be set to be 3 ms.

In yet another example, audio sample rate for A2C audio can be set to 1, indicating 128 samples per second, or 42.67 Ksps.

In yet another example, audio sample rate for C2A audio can be set to 4, indicating 48 samples per second, or 16 Ksps.

In yet another example, instead of using the MAX_RX_BLOCK_NUM_x and MAX_TX_BLOCK_NUM registers, MAX_OTA_BLOCK_NUM field in OTA_PACKET_CONFIG_x register can be used to control the maximum block number for each frame.

In yet another example, BLOCK_NUM_FIELD_LEN field in OTA_PACKET_CONFIG_x register can decide how many bits are used in a frame header for block number in current frame. In some embodiments, such a field can be set to 6; however, one can reduce it depending on application to save OTA data.

In yet another example, ACK_PREVIOUS_TR field in OTA_PACKET_CONFIG_x register can decide whether the audio acknowledgement in the frame header is for current transaction or previous transaction. In some embodiments, such a field can be set to 1 for all A2C frames, and set to 0 for headset frame. For HID frames, this field does not matter since such HIDs typically do not handle audio signals.

In some embodiments, functionalities associated with a group of packet descriptors as shown in FIG. 4 can be implemented for the protocol of FIG. 3. It will be understood that more descriptors can be utilized for even shorter HID latency values.

Referring to the example of FIG. 4, a group of 16 packet ids can be provided, with the first (packet id=0), second (packet id=1) and third (packet id=2) being assigned to support mouse, keyboard and arbiter (forward audio) operations, respectively, of a first sub-transaction. Similarly, the fourth (packet id=3), fifth (packet id=4) and sixth (packet id=5) can be assigned to support mouse, keyboard and arbiter operations, respectively, of a second sub-transaction.

Referring to the example of FIG. 4, the thirteenth (packet id=12), fourteenth (packet id=13), fifteenth (packet id=14) and sixteenth (packet id=15) can be assigned to support mouse, keyboard, headset (reverse audio) and arbiter sniff operations, respectively, of a third sub-transaction.

In the example of FIG. 4, the tenth (packet id=9) and eleventh (packet id=10) packet ids can be assigned to support operations involving arbiter synchronizing and client synchronizing, respectively.

In the example of FIG. 4, the seventh to ninth and twelfth (packet id=6, 7, 9 and 11) packet ids are unused. However, such packet ids can be utilized to support, for example, an additional sub-transaction to provide an even shorter HID latency.

Figure 5:
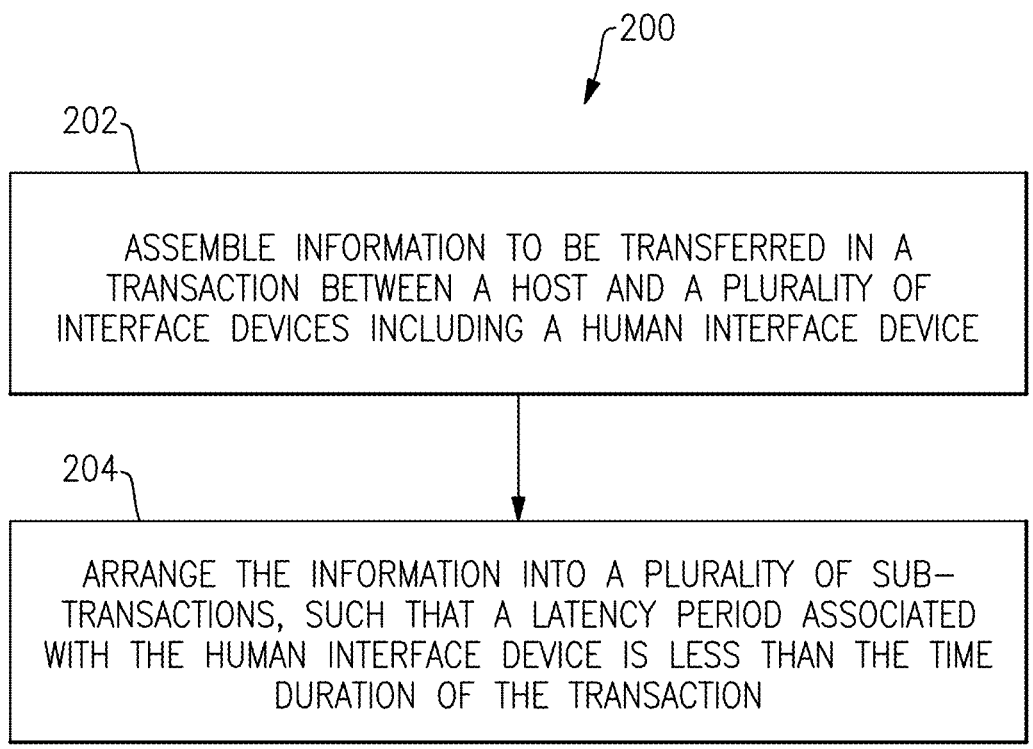
FIG. 5 shows a process that can be utilized to implement a wireless network protocol having one or more features as described herein.

FIG. 5 shows a process 200 that can be utilized to implement a wireless network protocol having one or more features as described herein. In process block 202, information to be transferred in a transaction between a host and a plurality of interface devices including a human interface device can be assembled. In process block 204, the information can be arranged into a plurality of sub-transactions, such that a latency period associated with the human interface device is less than the time duration of the transaction.

Figure 6:
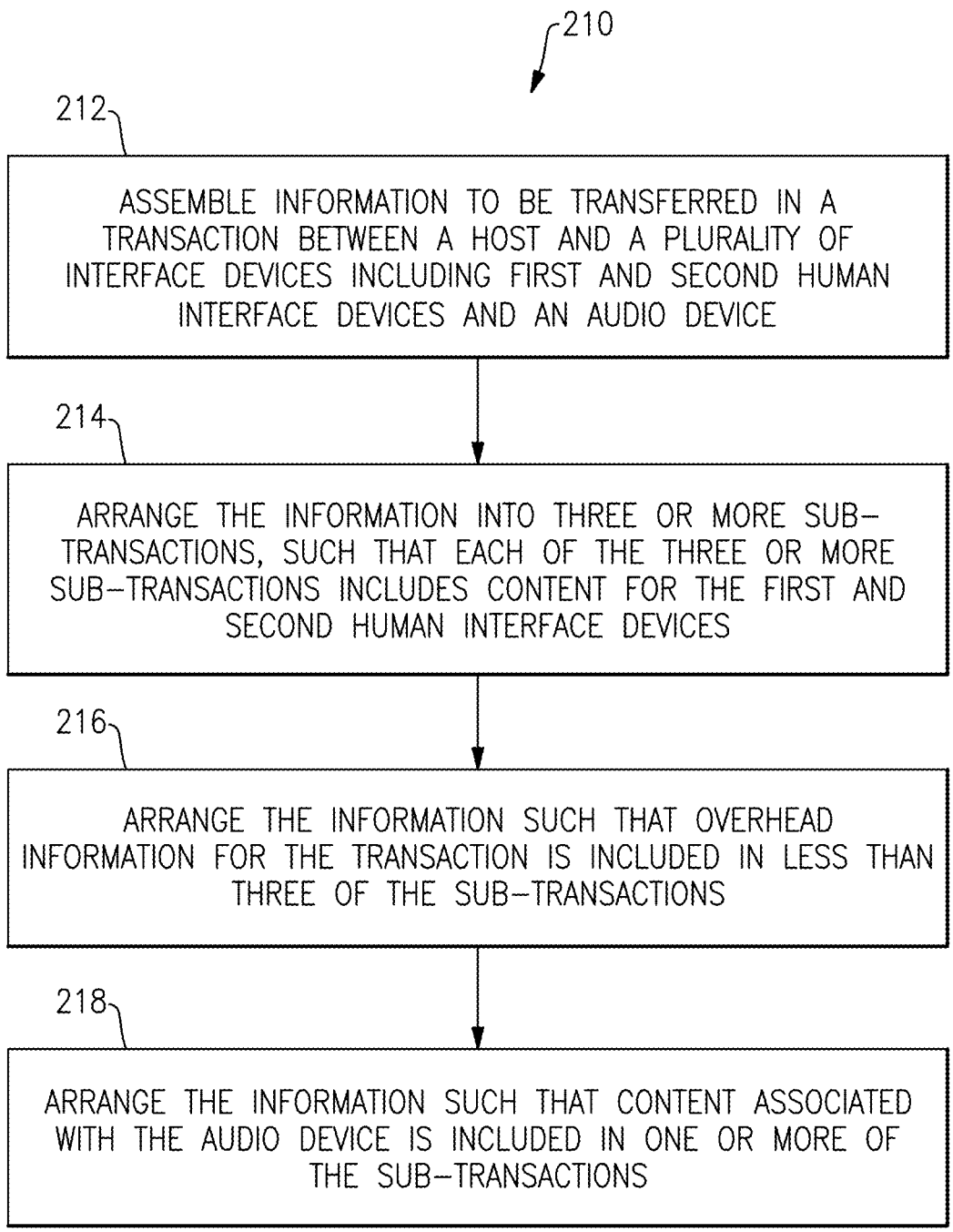
FIG. 6 shows a process that can be a more specific example of the process of FIG. 5.

FIG. 6 shows a process 210 that can be a more specific example of the process 200 of FIG. 5. In process block 212, information to be transferred in a transaction between a host and a plurality of interface devices including a human interface device and an audio device can be assembled. In process block 214, the information can be arranged into three or more sub-transactions, such that each of the three or more sub-transactions includes content for the first and second human interface devices. In process block 216, the information can be arranged such that overhead information for the transaction is included in less than three of the sub-transactions. In process block 218, the information can be arranged such that content associated with the audio device is included in one or more of the sub-transactions. In some embodiments, the process blocks 214, 216 and 218 can be performed at the same time, in different stages, or some combination thereof.

In some embodiments, the process 210 of FIG. 6 can be implemented with three sub-transactions forming a transaction. In such a configuration, each of the three sub-transactions can include content for the first and second human interface devices such as a mouse and a keyboard. Further, forward content for the audio device can be included in the first and second sub-transactions, and the third sub-transaction can include reverse content from the audio device. In some embodiments, overhead information needed for the transaction can be included in the third sub-transaction but not in the first or second sub-transactions.

Figure 7:
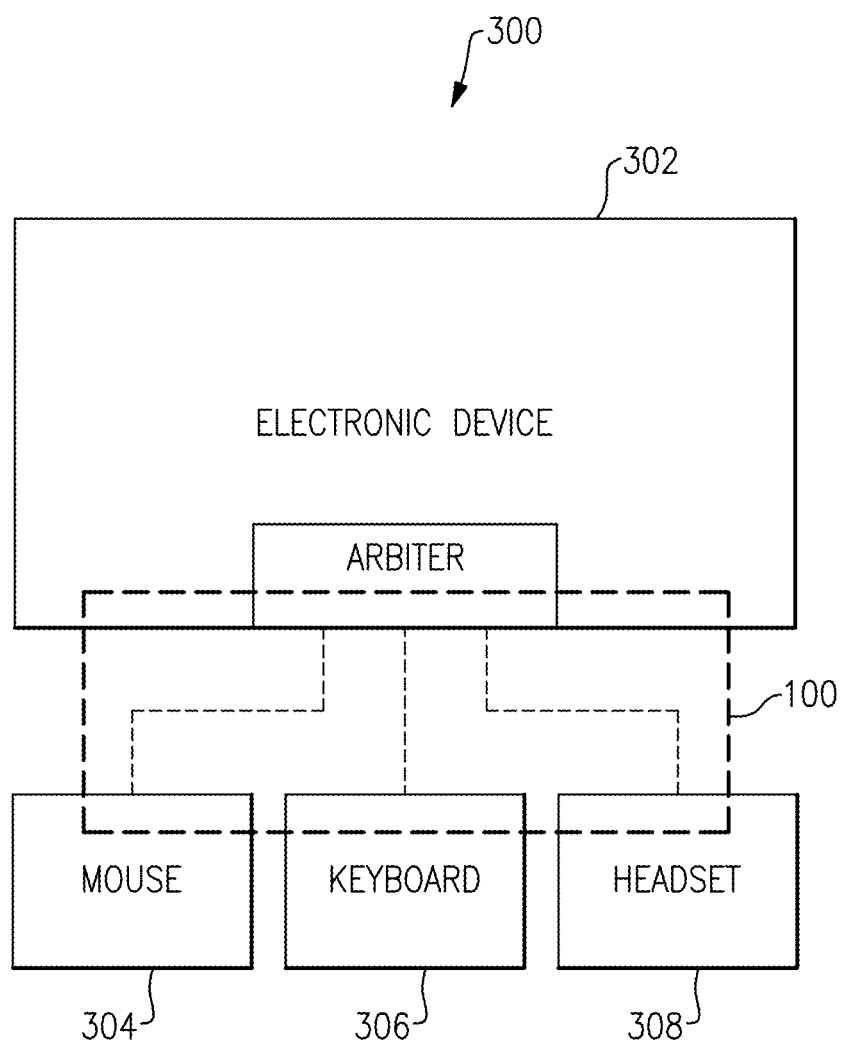
FIG. 7 shows an example of a system that includes one or more features of the present disclosure.

FIG. 7 shows that in some embodiments, a system 300 can include an electronic device 302 and a plurality of interface devices can be coupled (e.g., wirelessly) to the electronic device 302. For example, the interface devices can include a mouse 304, a keyboard 306, and a headset 308. Such interface devices can be in communication with the electronic device 302 through a wireless network protocol 100 as described herein. In some embodiments, an arbiter can be provided for the electronic device 302, and such an arbiter can support and/or control some or all of the wireless network protocol 100.

In some embodiments, the electronic device 302 of FIG. 7 can be, for example, a computer, a table, a smartphone, a gaming device or any electronic device having user interface functionality. In some embodiments, such an electronic device can include wireless communication functionality to support the wireless network protocol 100.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A wireless network architecture comprising:
a host device,
an audio device,
a human interface device, and
a network protocol for communication between the host device and each of the audio device and the human interface device, the network protocol including a transaction having a time duration, the transaction including a plurality of sub-transactions having time durations that are approximately the same and arranged in sequence, each sub-transaction having a frame for the human interface device such that a latency period of the human interface device is greater than or equal to the time duration of the sub-transaction and equal to 110% of the time duration of the sub-transaction, but less than the time duration of the transaction.

2. The wireless network architecture of claim 1 wherein the audio device is a headset.

3. The wireless network architecture of claim 2 wherein the plurality of sub-transactions includes a plurality of payloads to be delivered from the host device to the headset, and a payload to be delivered from the headset to the host device.

4. The wireless network architecture of claim 3 wherein the plurality of payloads includes an audio signal for the headset.

5. The wireless network architecture of claim 4 wherein the audio signal for the headset includes a stereo audio signal.

6. The wireless network architecture of claim 3 wherein the payload to be delivered from the headset to the host includes a voice signal.

7. The wireless network architecture of claim 6 wherein the voice signal includes a mono voice signal.

8. The wireless network architecture of claim 3 wherein the plurality of sub-transactions includes three sub-transactions, such that two of the three sub-transactions include the payloads for the headset and the third sub-transaction includes the payload from the headset.

9. The wireless network architecture of claim 1 wherein the human interface device includes a mouse or a keyboard.

10. The wireless network architecture of claim 9 further comprising an additional human interface device, such that each sub-transaction further includes a frame for the additional human interface device.

11. The wireless network architecture of claim 10 wherein the human interface device includes a mouse, and the additional human interface device includes a keyboard.

12. The wireless network architecture of claim 1 wherein the time duration of the transaction is at least 3 ms.

13. The wireless network architecture of claim 1 wherein the host device is a computing device.

14. The wireless network architecture of claim 13 wherein the computing device is a gaming device.

15. The wireless network architecture of claim 1 wherein a selected one of the sub-transactions includes overhead information needed for the completion of the transaction.

16. The wireless network architecture of claim 15 wherein the overhead information is included only in the selected sub-transaction and not in any other sub-transaction(s).

17. A system comprising:
a host device;
an audio device;
a human interface device; and
a network protocol configured to provide for communication between the host device and each of the audio device and the human interface device, the network protocol including a transaction having a time duration, the transaction including a plurality of sub-transactions having time durations that are approximately the same and arranged in sequence, each sub-transaction having a frame for the human interface device such that a latency period of the human interface device is greater than or equal to the time duration of the sub-transaction and equal to 110% of the time duration of the sub-transaction, but less than the time duration of the transaction.

18. A method for transferring wireless data, the method comprising:
assembling information to be transferred in a transaction with a time duration between a host device and a plurality of interface devices including a human interface device; and
arranging the information into a plurality of sub-transactions having time durations that are approximately the same, each sub-transaction having a frame for the human interface device such that a latency period of the human interface device is greater than or equal to the time duration of the sub-transaction and equal to 110% of the time duration of the sub-transaction, but less than the time duration of the transaction.

* * * * *